Nov. 7, 1967  S. M. SOLOMON  3,351,148
SELF-OPERABLE DETACHABLE POWER UNIT ATTACHMENT FOR
WHEEL CHAIRS AND POWER CONTROL UNIT THEREFOR
Filed Oct. 24, 1965  3 Sheets-Sheet 1
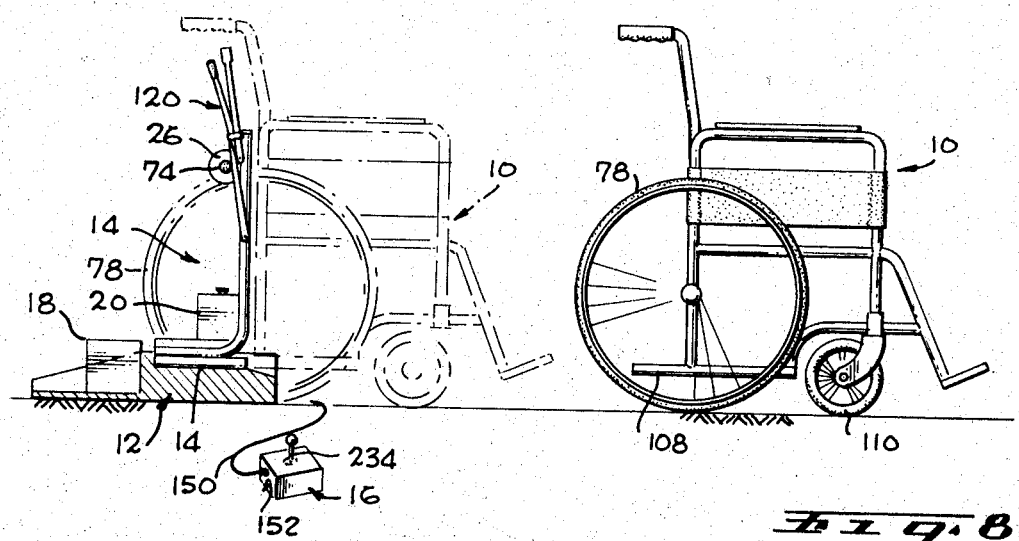
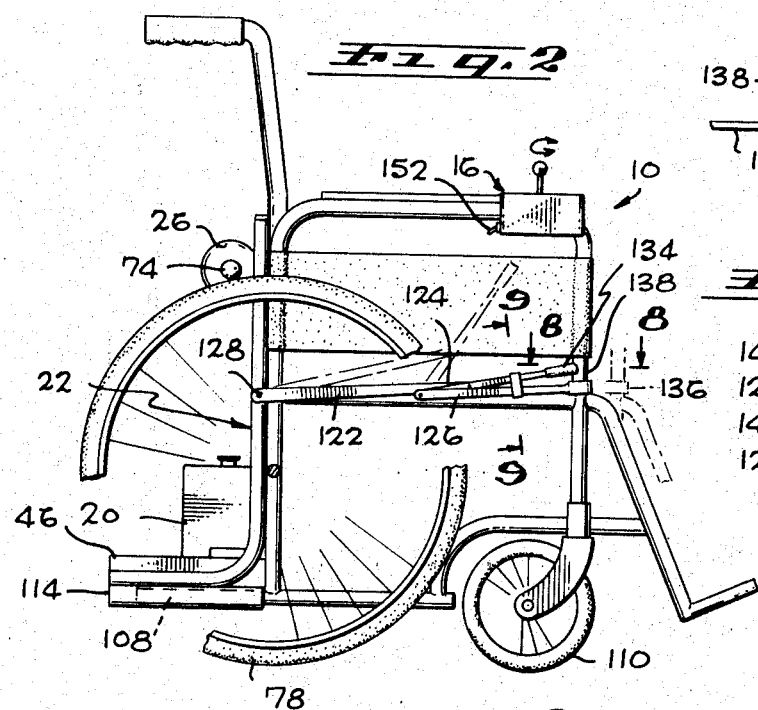
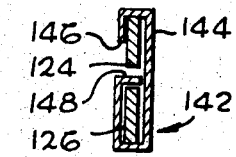
INVENTOR.
SHAWN M. SOLOMON
BY Allan M. Shapiro
ATTORNEY

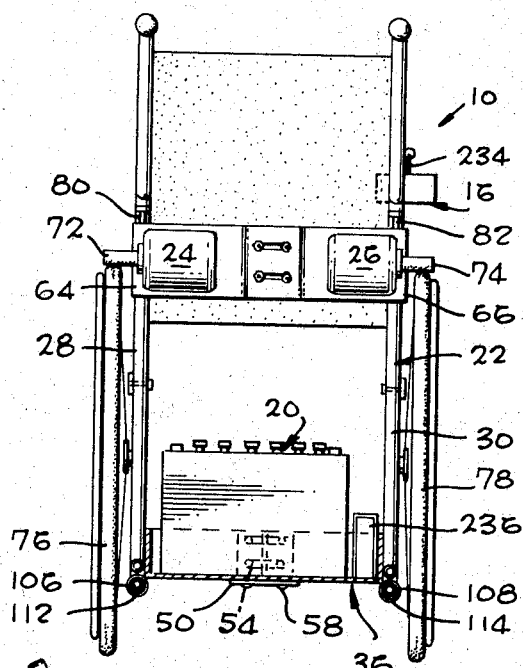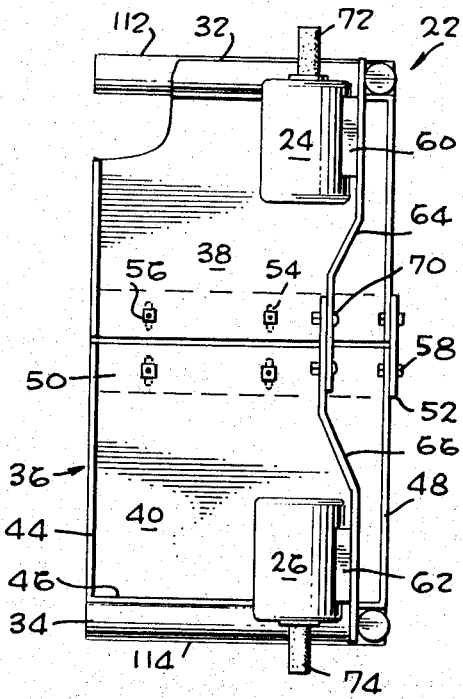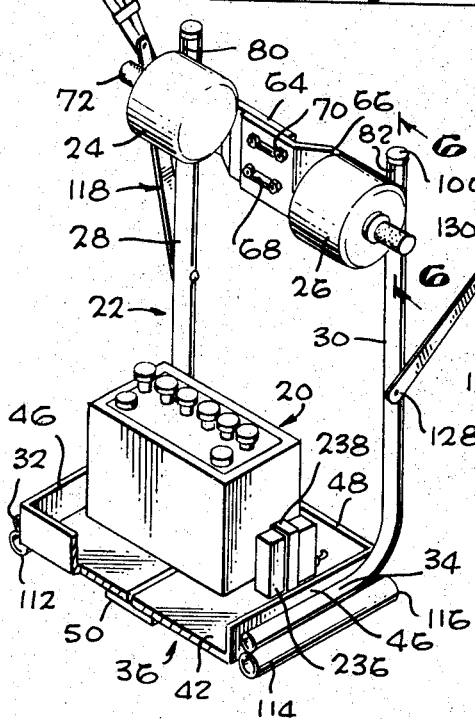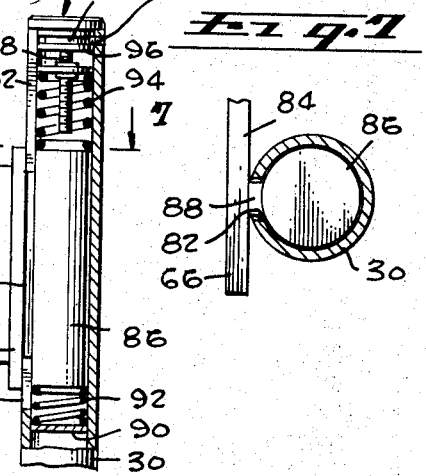

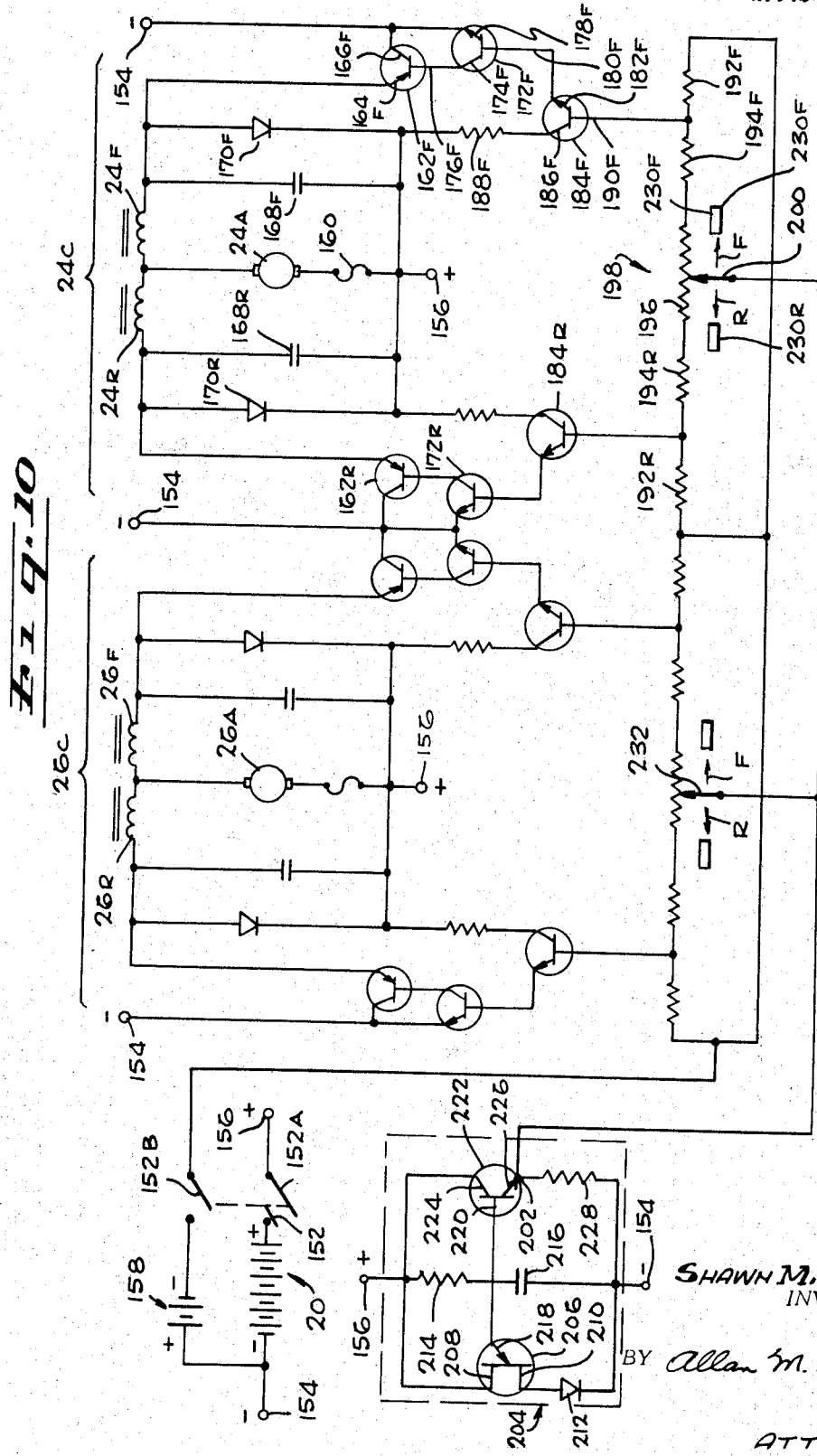

United States Patent Office 3,351,148
Patented Nov. 7, 1967

3,351,148
SELF-OPERABLE DETACHABLE POWER UNIT ATTACHMENT FOR WHEEL CHAIRS AND POWER CONTROL UNIT THEREFOR
Shawn M. Solomon, Los Angeles County, Calif.
(6640 Darby Ave., Reseda, Calif. 91335)
Filed Oct. 24, 1965, Ser. No. 504,316
24 Claims. (Cl. 180—6.5)

The present invention relates to wheel chairs and, more particularly, to electric power unit attachments therefor and associated driving and steering power control units.

There has long been a great need for powered wheel chairs to provide greater automobility for the invalid occupant whereby he can achieve independence from the need for a pushing assistant and increase his travelling range by both increasing the speed of travel and eliminating the muscle strain and fatigue of self-propulsion by means of the drive wheels of the chair.

There have been numerous attempts in the prior art to achieve the foregoing objectives. However, such attempts have been largely unsuccessful, both functionally and commercially, for several reasons such as, for example, requiring that the power unit be designed specifically for and built into the particular wheel chair model or else requiring expensive and/or inconvenient modification of the wheel chair for adaptation to the power unit, lack of removability of the power unit, requirements for assembly and disassembly of various portions of the power unit as well as the chair itself during respective attachment and removal of a power unit, complex and expensive as well as inefficient drive systems such as require gear heads and/or belt or chain drives, an additional fifth wheel to support the power unit and/or steer, low maximum speeds, slow starting and stopping responses, requirements for separate and independent braking action, and so forth.

It is among the principal objects of the present invention to provide a self-operable detachable power unit attachment for wheel chairs which overcomes the foregoing disadvantages.

It is therefore and additionally among the specific objects of the present invention to provide a power unit attachment for wheel chairs which can be readily attached to any standard wheel chair, does not require any modification of the existing wheel chair structure, can be readily removed from and attached to the wheel chair by the occupant of the wheel chair without assistance and while occupying the chair, is sturdy in construction and yet is relatively lightweight, can be readily stored by the user or inventoried by the dealer in a minimum space, does not interfere with manual operation of the wheel chair by either the occupant or an assistant, operates directly upon the drive wheels of the chair for maintaining the normal steering function and the operator's steering sensitivity comparable to or even exceeding the "feel" of manual steering, and is simple and economical to manufacture, maintain and repair.

Other problems in the prior art of powered wheel chairs relate to the driving and steering power control system. Past attempts to provide a power control system have suffered from the disadvantages resulting from the employment of a plurality of switches for applying predetermined increments of power, such disadvantages including the inherent mechanical problems of switches such as tendencies to get dirty, burn out, bend or break as well as the functional inability of such systems to provide for selection of turn radii and to compensate for unbalanced motors, unlevel floors, unequal weight distribution, unequal frictional drag such as may be occasioned by bad wheel bearings, and misaligned wheel chairs. Some systems employ power rheostats which are inherently inefficient and are subject to excessive heat and frequent failures. Both such prior systems require an excessive degree of manual dexterity for the usual invalid occupant and often require digital strength which is similarly excessive.

Therefore, it is among the objects of the present invention to provide a driving and steering power control unit for a powered wheel chair which overcomes the foregoing disadvantages and provides additional advantages by means of a single joy-stick control and novel electronic circuit system having infinite resolution and proportional control of both forward and reverse power applied to each of two electric motors coupled to respective ones of the drive wheels whereby the relative directions and speeds of rotation of the drive wheels are controlled in accordance with the desired performance of a wheel chair as it actually occurs rather than by predetermined but actually variable parameters of operation.

The features of the present invention which are believed to be novel are set forth particularly in the appended claims. The present invention, both as to its organization and manner of operation, together with further objects and advantages thereof, may best be understood by reference to the following description, taken in connection with the accompanying drawings, in which:

FIGURE 1 is a reduced-size side elevational view of a removable power unit attachment for a wheel chair in accordance with the present invention, a standard type of wheel chair being shown in solid lines and also in phantom lines, the latter being in partially cooperable relationship with the power unit, the power unit being shown in its resting position upon the mounting and removing stand in accordance with the present invention, and the control unit being illustrated diagrammatically in perspective;

FIGURE 2 is a side elevation view of the power and control units in mounted operable relationship on the wheel chair;

FIGURE 3 is a rear elevation view thereof, as seen from the left in FIGURE 2;

FIGURE 4 is a perspective view of the complete power unit attachment by itself, a portion of the battery platform being broken away;

FIGURE 5 is a top plan view of the complete power unit with the battery and connecting arm means omitted and a portion of the battery platform broken away, as seen substantially from the top in FIGURE 4;

FIGURE 6 is an enlarged fragmentary vertically sectioned view, partly in elevation, of one of the vertical frame members, as seen substantially along line 6—6 in FIGURE 4, showing means for adjustment of the frictional contact between one of the drive motors and its corresponding drive wheel of the wheel chair;

FIGURE 7 is a fragmentary enlarged horizontal sectioned view, partly in plan, as seen along line 7—7 in FIGURE 6;

FIGURE 8 is a fragmentary enlarged horizontally sectioned view, as seen substantially along line 8—8 in FIGURE 2, showing a means for hookable engagement of the power unit to the wheel chair;

FIGURE 9 is an enlarged transverse sectional view of a portion of the connecting arm means, as seen substantially along line 9—9 in FIGURE 2; and FIGURE 10 is a schematic diagram of the electronic circuit of the control unit.

Referring to the drawings, there is seen a partially diagrammatic illustration of a wheel chair indicated generally at 10 of any standard type, but normally and preferably of the collapsible type wherein the various cross members fold, bend, telescope, pivot or otherwise collapse in the lateral direction whereby the side members can be drawn together for reduced overall lateral dimensions so that the wheel chair is more readily portable and adapted for storage. Various portions of the standard type wheel chair illustrated will be described herein in connection with their particular cooperable relationships with the apparatus of the present invention; however, due to the symmetry of a wheel chair, both sides thereof normally being identical or at least mirror images of each other, the members on only one side or the other of the wheel chair may be mentioned from time to time, it being understood that the members constituting their opposite counterparts are intended to be included in the description.

As seen in FIGURE 1, the standard wheel chair 10 is shown on the right in solid lines prior to attachment or use of any portion of the apparatus in accordance with the present invention. As shown on the left in phantom lines, the wheel chair 10 has been disposed in adjacent relationship to a mounting platform indicated generally at 12 upon which is resting the power unit attachment 14 of the present invention, with the power control unit 16 being indicated as resting upon the floor for convenience of illustration. A battery recharging unit 18 is similarly indicated in disposition upon the mounting platform 12 for use in recharging the battery 20 of the power unit when the latter is not being employed upon the wheel chair 10.

Referring to FIGURES 1-5, in particular, there is seen a preferred embodiment of the electrical driving apparatus or power unit attachment in accordance with the present invention comprising frame means indicated generally at 22 for supporting both the battery 20 and a pair of reversible D.C. (direct current) electric motors 24 and 26 on the rear of the wheel chair 10. The frame means 22 is seen to comprise a pair of vertical parallel tubular frame members 28 and 30 having their respective lower portions 32 and 34 bent rearwardly into horizontally parallel relationship to each other. A battery support platform indicated generally at 36, is secured to the frame means 22 as by welding to the rearwardly extending frame member portions 32 and 34 and comprises a pair of platform members 38 and 40. Since the battery platform members 38 and 40 are of mirror-image configuration, only one 40 thereof will be described and is seen to comprise a bottom plate 42 and three side walls 44, 46 and 48, the side wall 46 being secured as by welding to the frame portion 34. A lateral adjustment member in the form of a horizontal plate 50 having a forward vertical flange portion 52 is provided with a plurality of lateral slots such as are indicated at 54 which are alignable with a plurality of bolts 56, the heads of which are recessed into the platform member 40 and project therethrough and through the slots 54 for receiving lock nuts 58 thereon, such elements permitting adjustment and setting of the lateral width of the battery platform 36 to conform to the particular width of the wheel chair 10 during initial assembly of the apparatus. A similar adjustment and setting is performed concurrently in connection with the motor mounts as will be described hereinafter.

Referring to FIGURES 3-5 in particular, it can be seen that the motors 24 and 26 are mounted as by members 60 and 62 onto respective mounting plates 64 and 66. The mounting plates 64 and 66 are provided with lateral slots such as slot 68 and bolt and nut fasteners indicated generally at 70 whereby, as described above in connection with the battery platform adjustment, an initial adjustment and setting of the effective combined width of the mounting plates 64 and 66 can be accomplished concurrently with such adjustment of the battery platform 36 whereby the drive shafts 72 and 74 of the respective motors 24 and 26 will be in appropriate vertical alignment with the respective drive wheels 76 and 78 of the wheel chair 10, as best seen in FIGURE 3. In accordance with the preferred embodiment of the present invention, the motors 24 and 26 are oriented horizontally in laterally back-to-back relationship with their drive shafts 72 and 74 in direct frictional driving relationship to the drive wheels 76 and 78. Preferably, the drive shafts 72 and 74 are at least coated with a polyurethane material of a type normally used in the electronic art for component and circuit encapsulation, it having been discovered that such material is particularly well suited for the illustrated purpose in that it exhibits the characteristics in this application of a high coefficient of friction, good abrasion resistance, and low moisture absorptivity, all of which factors contribute to generally better performance, structural strength and long life.

Referring to FIGURES 3, 4, 6 and 7, it is seen that the upper end of each of the tubular frame members 28 and 30 is provided with a rearwardly facing vertically entered slot 80 and 82. The elements involved in the cooperative relationship between the right-hand motor 26 and the right-hand frame member 30 will be described as particularly illustrated in FIGURES 6 and 7, the counterpart elements on the left-hand side being identical thereto. The forward surface 84 of the mounting plate 66 is provided with a vertical rod 86 having a diameter slightly less than the inner diameter of the frame member 30 so as to be freely vertically slidable therewithin and is connected to the plate 66 by a connecting spacer member 88 which similarly is vertically slidable within the slot 82. The frame member 30 is provided with an internal stop member 90 upon which rests a coil spring 92 beneath the rod 86 so that the spring 92 is normally at least partially compressed between the rod 86 and the stop member 90. A second coil spring 94 of preferably greater compression capacity and/or length than the lower spring 92 is disposed within the frame member 30 in downwardly abutting contact with the upper surface of the rod 86 and upwardly abutting contact with an upper stop member 96 so as to be normally compressed therebetween. The upper stop member 96 is threadably engaged with an externally threaded screw shank 98 secured to and projecting downwardly from a cap 100 adapted to fit within and over the end of the frame member 30 in closure relationship thereto. A set screw 102 is provided in the frame member 30 for admittance into an annular groove 104 in the end cap 100 for locking the latter to the frame member 30 insofar as relative vertical movement is concerned, but permitting rotation of the cap 100 and its screw shank 98 relative to the frame member 30 for adjustment purposes as will be described hereinafter.

In initially assembling the just-described portion of the apparatus, the lower spring 92 is dropped into the frame member 30, the motor mounting plate 66 and its rod 86 are positioned above the frame member 30 with the connecting member 88 in alignment with the slot 82 and then slid downwardly whereby the rod 86 is captured within the frame member 30 and rests upon the lower spring 92, the upper spring 94 is inserted into the frame member 30, and then the cap member 100 with the upper stop member 96 threaded upon its shank 98 is inserted and then retained by locking of the set screw 102. Thus, the motor 26 is relatively free-floating relative to the frame member 30 between the springs 92 and 94. The degree of such resiliency as well as the nominal position of the motor 26 and its frame-coupled rod 86 is adjustably set by rotation of the cap 100 relative to the frame member 30. The upper stop member 96 being rotationally immobilized by virtue of the friction with the abuttingly engaged upper spring 94, such rotation of the cap 100 and its screw shank 98 causes relative vertical movement of the upper stop member 96 for increasing or decreasing the compressional forces upon the upper spring 94 and, via the rod 86, upon the lower spring 92. Thus, the magnitude of the forcible contact between the motor drive shaft 74 and the drive wheel 78 of the wheel chair 10 can be controllably adjusted for the desired friction therebetween without appreciably affecting the shock-absorbing performance of such resilient mounting.

There now has been described a preferred embodiment in accordance with the present invention of a frame means 22 for supporting the pair of reversible electric motors 24 and 26 and their storage battery power source 20 for attachment to the rear of a wheel chair in operative association of the motor drive shafts 72 and 74 with the chair drive wheels 76 and 78. There now will be described a preferred embodiment, in accordance with further aspects of the present invention, of apparatus for both removably mounting and releasably connecting such frame means to the wheel chair whereby the occupant thereof can perform such functions unassisted.

Referring to FIGURES 1–5, it is seen that the standard wheel chair 10 is provided with a pair of horizontally spaced parallel tilting levers 106 and 108 constituting a portion of the wheel chair frame structure and extending rearwardly therefrom between the drive wheels 76 and 78, such tilting levers 106 and 108 being intended normally for use by an attendant or assistant for applying sufficient torque to the frame structure about the axis of the drive wheels 76 and 78 to raise the front wheels 110 and otherwise assist in maneuvering and performing other operations. In accordance with the present invention, the frame means 22 is provided with a pair of horizontally spaced parallel support means 112 and 114 each of which, in the preferred embodiment illustrated, constitutes a hollow tube having a forward end 116 open for permitting entry therein and receiving of the corresponding one of the tilting levers 106 and 108 in telescoped engagement. In the illustrated embodiment, the support tubes 112 and 114 are secured as by welding to the rearwardly extending portions 32 and 34 of the frame members 28 and 30. Of course, the support tubes 112 and 114 are in lateral alignment with the corresponding tilting levers 106 and 108, such alignment being obtained by the above-described lateral adjustments of the battery platform 36 and motor mounting plates 64 and 66 during initial assembly. Thus, as most clear in FIGURE 2, the entire frame means 22 and its supported motors and battery are removably mounted on and supported by the tilting levers of the wheel chair, except to the extent of the supporting force of the chair drive wheels applied via the motor drive shafts and the connecting arm means described hereinafter.

Referring to FIGURES 1, 2, 4, 8 and 9, there is seen a preferred embodiment of a pair of connecting arm means, indicated generally 118 and 120, only the latter one 120 of which is seen in detail and to be described hereinafter, the other one 118 being identical thereto. The illustrated arm means 120 comprises first, second and third arm members 122, 124 and 126, respectively, which are pivotally coupled together into a lever arm linkage assembly. The first arm member 122 has a rearward or first end pivotally connected at 128 to the frame member 30 in a manner such that the entire connection arm means 120 resides and is movable within an effectively single plane in the longitudinal direction. The second end of the first arm member 122 is pivotally connected at 130 to the second arm member 124 at a point intermediate the ends of the latter and preferably closer to the pivotal connection at 132 of the ends of the second and third arm members 124 and 126 so as to provide a mechanical advantage in operating the second arm member 124 by means of its handle end 134, as will be described more fully hereinafter. The third arm member 126 has a forward end provided with a hook means for hooked engagement with the wheel chair frame structure and, as best seen in FIGURE 8, comprises a portion 136 which is bent laterally inwardly about a radius and a distance sufficient to engage a front tubular portion 138 of the wheel chair frame structure. A resilient pad 140 is adhesively secured to the hook portion 136 to minimize slipping or marring on the surface of the frame structure portion 138. A hook member 142 is secured to the third arm member 126 in longitudinally slidable relationship thereto and has a hook portion 144 extending upwardly, inwardly and downwardly so as to be adapted for selectively releasably hooked engagement with the second arm member 124 when the latter is in either of the positions illustrated in FIGURES 1 and 2, such engagement being accomplished by merely laterally inserting the arm member 124 through the aperture provided by the hook end 146 and the bottom portion at 148 and then permitting the arm member 124 to rest within the confining region defined by the hook portion 144, as seen in FIGURE 9. The hook member 142 may be slid toward the common pivotal connection 132 of the second and third arm members 124 and 126 prior to such hooked engagement for facilitation thereof and then slid forwardly after such hooked engagement to increase the assurance of positive locked engagement. Alternatively, the hook member 142 may be secured to the second arm member 126 and conversely employed for hooked engagement with the third arm member 126.

Although the operation of the above-described apparatus should now be clear, additional or clarifying aspects may be pointed out, particularly with reference to the operation of the conecting arm means 120. Referring to the drawings, the wheel chair 10 shown in phantom lines in FIGURE 1 has been positioned by the occupant (not shown) with its drive wheels disposed on either side of the mounting platform 12 upon which is resting the power unit atachment 14 as has been described, with the tilting levers at least partially telescopically inserted into the support tubes 112 and 114, such disposition being accomplished by merely rolling the wheel chair 10 rearwardly into that position since the mounting platform 12 maintains the support tubes at the same elevation as the tilting levers. However, as the drive wheels 76 and 78 come into contact with the motor drive shafts 72 and 74, the latter tend to resist further coupling or rearward movement of the drive wheels and the wheel chair, primarily because of the force exerted by the upper springs 94 in the frame members 28 and 30. Accordingly, although many wheel chair occupants can apply sufficient pushing force with their legs against the floor or with their hands against the drive wheels to complete the telescoping engagement of the tilting levers and the support tubes, the connecting arm means 120 permits accomplishment of this objective in an extremely simple manner. The connecting arm means 120, as shown in its rearwardly tilting rested position against the motor shaft 74 in FIGURE 1, is rotated downwardly and forwardly by the occupant and, after the hooked engagement of the second and third members 124 and 126 by the hook member 142 is released, the forward end hook portion 136 is placed in hooked engagement with the forward frame structure portion 138 (as best seen in phantom lines in FIGURE 2), with the overall distance between the rearward frame-connecting end at 128 and the forward hook end 136 being somewhat as illustrated in FIGURE 2, the arm members assuming the approximate disposition similarly indicated in phantom lines in FIGURE 2. Then, the occupant grips the handle 134 and, by merely pivotally depressing the lever arm member 124, causes the overall effective length of the connecting arm means 120 to be shortened and correspondingly causes the frame means 22 and the wheel chair 10 to be drawn together into the final position illustrated in solid lines in FIGURE 2. Of course, to whatever extent the telescoping engagement of the tilting levers and the support tubes had not previously been accomplished, such drawing together of the frame means 22 and wheel chair 10 completes such objective and the power unit attachment 14 is in its operative position, the occupant of the wheel chair having performed all of the attachment functions and operations by himself. Similarly, of course, the removal of the power unit attachment 14 is accomplished by the occupant by mere reversal of the foregoing sequence of operations.

For the sake of clarity and convenience of illustration, various electrical wires have not been illustrated. However, it should be clear to those skilled in the art that the storage battery 20 or any equivalent direct current electrical power source is connected to the electric motors 24 and 26 by various wires which, if desired, may be run through the frame means 22 primarily for aesthetic reasons. Similarly, the driving and steering power control unit 16 is provided with a wire cord means 150 operatively connected to the battery 20 and the motors 24 and 26 for operational control thereof. The control unit 16 may be connected permanently to the power unit attachment 14 by means of the cord 150, in which case the unit 16 is left with the unit 14 when the latter is removed from the wheel chair 10, and the unit 16 is clamped onto the frame structure of the wheel chair by any convenient means in the position illustrated in FIGURES 2 and 3 when the power unit attachment 14 is operatively associated with the wheel chair, or else the control unit 16 may be relatively permanently affixed to the wheel chair in the illustrated position and a plug connector (not shown) used for connecting the control unit 16 and the cord 150, the latter being normally connected to the attachment 14.

A battery recharging unit 18 is indicated diagrammatically in FIGURE 1 as located upon the rear of the mounting platform 12 and may be of any type well known in its art for selective attachment to the storage battery 20 for recharging thereof during periods of non-use. It may be noted, however, that standard 12-volt storage battery may be normally used in this application for two or three days or more without recharging, particularly as an on-off switch 152 is employed on the power control unit 16 for electrical disconnection of the battery 20 during periods of non-use when the apparatus is otherwise attached and usable.

Referring to FIGURE 10 in particular, there is seen a schematic diagram of a preferred embodiment in accordance with the present invention of a solid-state electronic power control circuit, all of the indicated components of which may be physically located within the chairarm mounted box of the control unit 16 with the exception of the motors and storage battery, the same or similar reference numerals being used in reference thereto. The motors 24 and 26 preferably employed herein are of the series wound, split field bi-directional rotation, direct current, three terminal type having respective armatures indicated generally at 24A and 26A, forward field windings 24F and 26F, and reverse field windings 24R and 26R, the designations "forward" and "reverse" referring to the corresponding direction of shaft rotation for driving the wheel chair drive wheels in the respective forward and reverse directions. As is clearly illustrated, the circuit portions designated generally at 24C and 26C are identical in construction and, since their operation is similarly identical in regard to their respective motors 24 and 26, only one such circuit portion 24C will be referenced in detail. Still further, within the circuit portion 24C, identical components are operatively and symmetrically associated with the forward and reverse field windings 24F and 24R and, accordingly, only those components bearing the suffix reference letter F will be referred to primarily herein, the counterpart components in association with the reverse field winding 24R bearing the suffix reference letter R and being referred to only as particular circuit operations may require.

In general, a series wound motor (as distinguished from a shunt wound motor) is preferably employed herein because it develops maximum torque at stall or zero revolutions of the drive shaft and, concomitantly, of the armature 24A. Such condition is desirable since maximum torque is required to start the wheel chair moving and then, as the wheel chair starts moving, the torque required to maintain or increase the speed of the wheel chair decreases at substantially the same rate (for practical purposes) as the torque-developing capacity of the motor decreases. By having split field windings 24F and 24R, bi-directional rotation is obtained in accordance with the desired maneuverability and other performance objectives of the wheel chair which is accomplished by driving both of the chair wheels forward at the same or differing speeds, both in reverse at the same or differing speeds, one wheel forward and the other wheel in reverse at the same or differing speeds, or one or the other of the wheels at any desired speed in forward or reverse while the other wheel is not driven. Reversing motor direction electrically saves reversing power normally lost in gears, clutches and other expensive mechanical assemblies.

Referring to the circuit in detail the DC power supply battery 20 with indicated polarities is illustrated as having a negative terminal 154 for supplying a reference potential and a positive terminal 156 for supplying a positive potential (such "reference" and "positive" potentials being so referred to hereinafter) via on-off switch contact 152A of DPST on-off switch 152, the other contact 152B of which connects the negative side of a bias battery 158 into the circuit with its positive side connected to the reference potential. The terminals 154 and 156 are shown for convenience of illustration and clarity of description only, the various positive and negative terminals throughout the schematic drawing actually being connected thereto and, accordingly, indicated by the same reference numerals.

One side of the forward field winding 24F is connected to the positive potential 156 via the motor armature 24A and a fuse 160, and the other side of the forward field winding 24F is connected to the reference potential 154 via a PNP type high power transistor 162F, the latter having its emitter 164F connected to the winding 24F and its collector 166F connected to the reference potential. Thus, the motor winding 24F is effectively across the power supply 20 to the extent that current is controllably permitted to flow through transistor 162F, and the remainder of the circuit accomplished such control. The junction of the winding 24F and transistor 162F is AC-coupled to the positive potential 156 by a capacitor 168F. A diode 170F is connected similarly with its polarity as indicated so that its negative side is connected to the positive potential 156. An NPN type intermediate power transistor 172F has its collector 174F connected to the base 176F of transistor 162F, its emitter 178F connected to the reference potential 154, and is base 180F connected to the emitter 182F of an NPN type low power transistor 184F, the latter having its collector 186F connected to the positive potential 156 via a resistor 188F. The base 190F of transistor 184F is connected to the junction of series resistors 192F and 194F, the latter resistors being part of a bias network further comprising the series resistors 192R and 194R and the resistance element 196 of a potentiometer indicated generally at 198. The free ends of the resistors 192F and 192R are commonly connected through on-off switch contact 152B to the negative side of bias battery 158 which preferably is of the three volt dry cell type.

The movable contact element 200 of the potentiometer 198 is connected to the output at 202 of a sawtooth waveform voltage generator indicated generally at 204. The generator 204 is basically a relaxation type oscillator and preferably comprises a unijunction transistor 206 having one of its bases 208 connected to the positive potential 156 and its other base 210 connected to the positive side of a diode 212, the other side of which is connected to the reference potential 154. A resistor 214 and a capacitor 216 are connected in series between the respective positive and reference potentials 156 and 154, their common connection being connected to the emitter 218 of the unijunction transistor 206 and the base 220 of an NPN type transistor 222, the latter having its collector 224 connected to the positive potential 156, and its emitter 226 providing the output junction 202 by connection with one side of an output load resistor 228, the other side of which is connected to the reference potential 154.

The high power transistor 162F operates effectively as a switch through which is controllably passed the current for and through the forward field winding 24F and accordingly, is a high current transistor capable of carrying current in excess of the stall current level of the motor 24. For more efficient operation, a low saturation voltage is desirable as power is lost across transistor 162F at saturation; accordingly, a germanium type transistor is preferably because of a typical potential drop of 0.3 volt whereas a silicon type of power transistor has a potential drop of approximately 1.0 volt. The power rating should be such that the product of the transistor's saturation voltage ($V_{CE-sat.}$) and the motor's stall current is less than the transistor's power rating at room conditions (approximately 25° C.). The collector-emitter voltage rating ($V_{CE}$) should be at least equal to the voltage of the power source which, in this case, is the storage battery 20 having a nominal rating of preferably 12 volts.

The intermediate transistor 172F has a collector current capable of keeping transistor 162F safely saturated. Transistors 162F and 172F preferably are of opposite types, i.e., if one is a PNP type, then the other should be an NPN type for the reasons that, in such cases, the magnitude of $I_{CO_1} \times B_2$ (the product of the leakage current through the collector 174F of transistor 172F and the beta of transistor 172F) is approximately equal to the magnitude of $I_{CO_2}$ (the leakage current through the collector 166F of transistor 162F) and, since they oppose each other, they effectively eliminate their counteracting effects, thus eliminating the need for stabilization resistors with their consequent power losses and improving efficiency thereby. If the transistors 162F and 172F are of the same type, stabilization presents difficulties because of leakage current multiplication.

The low power transistor 184F has a collector current capable of safely saturating transistor 172F and can be composed of either silicon or germanium semi-conductor material and of either PNP or NPN type. Of course, differences in such type require an effective reversal of the collector-emitter relationship in the circuit. The current levels of transistor 184F are so low that leakage current does not present a sufficient problem to require stabilization.

Diode 170F protects transistor 162F from the voltage "kick" (back E.M.F.) occasioned by the collapse of the inductive field in the motor winding 24F when cut-off of transistor 162F turns off the motor. It may be noted that the diode 170F can be eliminated if transistor 162F is selected to have a very high collector-emitter voltage rating and the various power transistors are connected in a common-emitter arrangement; however, the illustrated circuit arrangement is more economical and reliable.

Capacitor 168F is provided primarily for additional protection of transistor 162F during the operating condition when the reverse field winding 24R is energized but the forward field winding 24F is not energized, i.e., transistor 162F is non-conducting. Under such circumstances, current is induced in the forward field winding 24F and it acts like an AC (alternating current) generator so that very high voltage spikes would be applied to the emitter-collector junction of transistor 162F such that the rated $BV_{CBO}$ (back voltage on the collector with the base open) of transistor 162F may be exceeded, resulting in irreversible breakdown thereof. Capacitor 168F provides protection thereagainst by providing an AC path from the forward field winding 24F for effectively shunt filtering the AC spikes.

Although the collector 186F of transistor 184F may be commonly connected with the emitter 164F of transistor 162F to the positive potential 156 via the field winding 24F, such connection would tend to diminish the effectiveness of transistor 184F for the reasons that the potential at the emitter 164F drops to a relatively low value during conduction of transistor 162F, such low value being insufficient to maintain adequate conduction levels for transistor 184F if applied to the collector 186F. Accordingly, resistor 188F couples the collector 186F directly to the positive potential 156 for isolating transistor 184F from the effects of transistor 162F and thereby maximizing the saturation voltage level that is applicable to transistor 162F via transistors 184F and 172F.

The sawtooth generator 204 operates in the following manner. At the beginning of an operating cycle, as when the power switch 152 is turned on, the emitter 218 of the unijunction transistor 206 is reverse-biased and therefore non-conducting. As the capacitor 216 is charged through the resistor 214, the voltage at emitter 218 rises exponentially toward the value of the positive potential at 156. When the emitter voltage reaches a peak point, the emitter 218 becomes forward biased and the dynamic resistance between the emitter 218 and base 210 suddenly drops to a low value. The capacitor 216 then discharges through the emitter 218. When the emitter potential decreases to a predetermined value, partially determined by the minimum conduction level of diode 212, the emitter 218 ceases to conduct and the cycle is repeated. Thus, the voltage waveform at the emitter 218 of the unijunction transistor 206 is a fair approximation of a sawtooth waveform, and such signal is direct-coupled to the base 220 of transistor 222 which, together with resistor 228, constitutes an emitter-follower stage for providing current gain as well as isolating the unijunction emitter 218 from loading effects. Preferably, transistor 222 is a germanium type of NPN transistor because the minimum voltage conduction level is less than the normal base-to-emitter voltage drop of the unijunction transistor 206 and, accordingly, the waveform across the output load resistor 228 is not clipped. Also, the output current at 202 is drawn directly through transistor 222, thereby permitting use of a higher value resistor 228 without introducing waveform distortion with variations in the output load, and such higher value resistance reduces the power dissipation by resistor 228.

The operation of the circuit illustrated in FIGURE 10 will be described further now, together with additional features of component construction and location. With the power switch 152 on, the the sawtooth generator 204 supplies a continuous pulse train of positive sawtooth pulses to the resistance element 198 at the point of location of the movable contact element 200. Transistor 184F does not conduct unless and until the potential applied to its base 190F is at least about one volt more positive than the potential at its emitter 182F. The voltage dividing network comprising the resistors 192F and 194F and the portion of the resistance element 198 between the resistor 194F and the movable contact element 200 have applied thereacross a varying potential equal to the algebraic sum of the sawtooth-varying positive potential from the sawtooth generator 204 and the negative bias potential from the bias battery 158, both such bias potentials obviously being relative to the reference potential 154. When the movable contact element 200 is in its center rest position relative to the resistance element 198, the bias potential available at the base 190F is insufficient to cause conduction and maintains transistor 184F in its non-conducting state. When the movable contact element 200 is moved in the forward direction, as indicated by the arrow F, the reduced resistance portion of the resistance element 198 thus included within the voltage dividing network causes the sawtooth-varying potential at the transistor 190F to peak at values of sufficient magnitude to cause conduction of the transistor 184F during such peak portions. Such conduction bias increases in both magnitude and duration as the contact element 200 is moved in the forward direction F until, at the extreme end of the resistance element 190 as may be determined by a mechanical stop 230F, a conduction level of bias potential is applied during the full pulse duration and, accordingly, transistor 184F remains in the conducting state continuously.

Now turning further to the operation of the transistors 162F, 172F and 184F, conduction of transistor 184F causes a corresponding conduction bias potential to be applied to the base 180F of transistor 172F which accordingly becomes conductive for applying a conduction bias potential to the base 176F of transistor 162F which, similarly, becomes conductive and draws current therethrough, such current passing through the forward field winding 24F. Each of the transistor stages successively amplifies the signal received effectively on its base and, accordingly, the voltage signal appearing on the base 190F of transistor 184F is represented by a very small current with correspondingly small power dissipation through the voltage divider network but results in a very high current through transistor 162F, which latter current may be as much as twenty-five amperes or more during full saturation conduction.

Thus, there has been described a fixed frequency variable pulse width control system for selectively controllably varying the extent and direction of energization of a pair of DC motors for driving a wheel chair. It should be noted that the frequency of the oscillations of the pulse generator 204 is an important consideration. If the frequency is too low, the motors turn on and off too slowly with resultant objectionable vibration or shaking of the wheel chair. On the other hand, if the frequency is too high, the inductance of the motor will not allow the current to build up and develop a desirable sufficient torque before the pulse turns off, resulting in an inefficient system. Therefore, the RC time constant of resistor 214 and capacitor 216 is chosen to provide an intermediate oscillation frequency having a pulse repetition rate just high enough to avoid vibratory effects. Although resistor 214 and capacitor 216 preferably have pre-determined fixed values for economy, either or both thereof may be variable for adjustment of the frequency in accordance with the electrical and mechanical parameters of the motors and the wheel chair.

While the preferred embodiment of the foregoing circuit in accordance with the present invention includes a pulse generator because of the greatly improved efficiency thereof, the sawtooth generator 204 being specifically preferred, the pulse generator 204 may be eliminated and the contact elements 200 connected directly to the positive potential 156 so that the transistor 184F and the successive transistor stages are continuously conducting (when the contact element 200 is in a forward position) independently of the extent of such forward position except in terms of the magnitude of conducting bias potential applied thereto and thereby rather than in accordance with the width of the pulse at the conducting bias level.

It should be clear that the other potentiometer contact element 232 is movable with or independently of the described contact element 200 and in either the forward or reverse directions. Furthermore, the relatively movable relationship of the contact element and the resistance element of the potentiometer may be accomplished by movement of the resistance element while the contact element remains stationary, and in a rectilinear or rotary movement, depending upon the type of potentiometers employed, such determinations being dictated largely by the type of universal movement mechanism of the joystick apparatus of which control lever 234 is indicated in FIGURE 1. In this connection, it may be noted that all of the components illustrated in FIGURE 10, with the exception of the motors and battery 20, may be located within the power control box 16. However, it is preferred, for convenience of size and maintenance as well as security against accidental damage, to locate only the power switch and the joystick controlled potentiometers within the chair-arm box 16, with the remainder of the electronic components disposed within a separate enclosure 236 (see FIGURES 3 and 4) which is removably mounted on the battery platform 36 as by a clamp 238, with appropriate electrical wiring (not shown) in accordance with the circuit of FIGURE 10.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In the combination of a wheel chair and an electrical driving apparatus therefor, said wheel chair being of the type having a frame structure for supporting a person, a plurality of wheels at least two of which are disposed on opposite sides of the frame structure to constitute drive wheels, and a pair of tilting levers extending rearwardly from the frame structure and between the drive wheels, said electrical driving apparatus being of the type having a pair of reversible electric motors each having a drive means rotatable thereby and individually associated with the drive wheels, battery means for supplying current to the motors, control means connected between the motors and the battery means to selectively energize the motors to both drive and steer the wheel chair by the relative rotation of the drive means, and a frame means for supporting the motors and battery means on the rear of the wheel chair and between the drive wheels, apparatus for removably mounting and releasably connecting the frame means to the wheel chair comprising:

a pair of horizontally spaced parallel support means secured to said frame means for receiving said tilting levers in telescoped engagement therewith; and a pair of connecting arm means individually connected to said frame means and adapted for releasably retained engagement with the frame structure of the wheel chair.

2. Apparatus in accordance with claim 1 wherein each of said support means constitutes a hollow tube having a forward end open for permitting entry therein of the corresponding one of said tilting levers and having a smooth continuous interior surface only slightly greater in dimensions than the dimensions of such tilting lever.

3. Apparatus in accordance with claim 1 wherein each of said connecting arm means comprises a rearward end and a forward end, said rearward end being pivotally connected to said frame means, and said forward end being provided with hook means adapted for hooked engagement with the wheel chair frame structure.

4. Apparatus in accordance with claim 1 wherein each of said connecting arm means comprises a lever arm linkage assembly including:

a first arm member having first and second ends, said first end being pivotally connected to the frame means;

a second arm member having third and fourth ends, said second end being pivotally connected to said second arm member intermediate said third and fourth ends; and a third arm member having fifth and sixth ends, said fifth end being pivotally connected to said fourth ends, said sixth end being adapted for hooked engagement with the wheel chair frame structure.

5. Apparatus in accordance with claim 4 wherein said arm members residue and are movable within an effectively single plane and are manually pivotally movable relative to each other and the frame means for alternative lengthening and shortening of the distance between said first and sixth ends whereby, after such hooked engagement of said sixth end to the frame structure, such distance shortening movement causes the frame means and the frame structure to be drawn toward each other for abutting engagement therebetween and simultaneous telescoping engagement of said support means and said tilting levers.

6. Apparatus in accordance with claim 5 wherein each of said support means constitutes a hollow tube having a forward end open for permitting entry therein of the corresponding one of said tilting levers and having a smooth continuous interior surface only slightly greater in dimensions that the dimensions of such tilting lever.

7. Apparatus in accordance with claim 6 wherein said third end of said second arm member constitutes a lever handle for forward and rearward manipulation by the occupant of the wheel chair for causing respective such distance shortening and lengthening movement.

8. Apparatus in accordance with claim 7 including:
 a hook member secured to one of said second and third arm members and having a portion adapted for selectively releasably hooked engagement with the other of said second and third arm members for preventing relative movement between said second and third arm members.

9. Apparatus in accordance with claim 8 wherein said hook member is secured to one of said second and third arm members in longitudinally slidable relationship thereto whereby said hook member may be selectively positioned along the length thereof both prior to and after such hooked engagement with the other of said second and third arm members.

10. Electrical driving apparatus for a wheel chair of the type having a frame structure for supporting a person and having a pair of vertical rear members, a plurality of wheels at least two of which are disposed on opposite sides of the frame structure to constitute driving wheels, a pair of tilting levers extending rearwardly from the frame structure and between the wheels, and control means including a control unit which is connected to the electrical driving apparatus to control both the driving and steering of the wheel chair by the relative rotation of the driving wheels, comprising:
 a parallel pair of rigid tubular frame members, each having a vertical portion and a rearwardly extending horizontal portion integral therewith, said vertical portion being adapted to forwardly abut against a corresponding one of said pair of frame structure vertical rear members and having an open top end provided with a downwardly extending rearwardly facing vertical slot;
 a battery platform means disposed between and secured to said horizontal portions of said frame members and adapted to receive a battery means thereon;
 a pair of horizontally parallel support tubes each secured to a respective one of said horizontal portions of said frame members adapted for receiving a corresponding one of said tilting levers in telescoped engagement therewith for supporting the electrical driving apparatus on the wheel chair;
 motor mount means having a pair of opposite ends, each of said ends having a forward and a rearward surface, said forward surface being provided with vertical rod means and a spacer member connecting said rod means to said forward surface, said rod means being disposed and captured within said vertical portion of said frame member in vertically slidable relationship thereto, said spacer member being disposed within said slot in vertically slidable relationship thereto;
 a pair of reversible electric motors mounted on said forward surfaces of said motor mount means and having drive shaft means in driving engagement with the drive wheels;
 each said vertical portion of each said frame member having a lower stop member secured therewithin at a location beneath said slot, a lower spring disposed between said rod means and said lower stop member in compressed abutment therewith, a cap member at least partially disposed within said vertical portion at said open top end in vertically retained rotatable engagement therewith and provided with a coaxial screw shank vertically depending therefrom and projecting concentrically into said vertical portion, an upper stop member threadably mounted on said screw shank in threadably rotational engagement therewith, and an upper spring disposed within said vertical portion between said rod means and said upper stop member in compression abutment therewith; and
 a pair of connecting arm means each pivotally secured to a corresponding one of said vertical portions and adapted for releasably retained engagement with the frame structure of the wheel chair.

11. Apparatus in accordance with claim 10 wherein each of said support tubes constitutes a hollow tube having a forward end open for permitting entry therein of the corresponding one of said tilting levers and having a smooth continuous interior surface only slightly greater in dimensions than the dimensions of such tilting lever.

12. Apparatus in accordance with claim 10 wherein each of said connecting arm means comprises a rearward end and a forward end, said rearward end being pivotally secured to said vertical portion, and said forward end being provided with hook means adapted for hooked engagement with the wheel chair frame structure.

13. Apparatus in accordance with claim 10 wherein each of said connecting arm means comprises a lever arm linkage assembly including:
 a first arm member having first and second ends, said first end being pivotally secured to said vertical portion;
 a second arm member having third and fourth ends, said second end being pivotally connected to said second arm member intermediate said third and fourth ends; and
 a third arm member having fifth and sixth ends, said fifth end being pivotally connected to said fourth end, said sixth end being adapted for hooked engagement with the wheel chair frame structure.

14. Apparatus in accordance with claim 13 wherein said arm members reside and are movable within an effectively single plane and are manually pivotally movable relative to each other and the frame members for alternative lengthening and shortening of the distance between said first and sixth ends whereby, after such hooked engagement of said sixth end to the frame structure, such distance shortening movement causes the frame members and the frame structure to be drawn toward each other for abutting engagement therebetween and simultaneous telescoping engagement of said support tubes and said tilting levers.

15. Apparatus in accordance with claim 14 wherein each of said support tubes constitutes a hollow tube having a forward end open for permitting entry therein of the corresponding one of said tilting levers and having a smooth continuous interior surface only slightly greater in dimensions than the dimensions of such tilting lever.

16. Apparatus in accordance with claim 15 wherein said third end of said second arm member constitutes a lever handle for forward and rearward manipulation by the occupant of the wheel chair for causing respective such distance shortening and lengthening movement.

17. Apparatus in accordance with claim 16 including:
 a hook member secured to one of said second and third arm members and having a portion adapted for selectively releasably hooked engagement with the other of said second and third arm members for preventing relative movement between said second and third arm members.

18. Apparatus in accordance with claim 17 wherein said hook member is secured to one of said second and third arm members in longitudinally slidable relationship thereto whereby said hook member may be selectively positioned along the length thereof both prior to and after such hooked engagement with the other of said second and third arm members.

19. Electrical driving apparatus for a wheel chair of the type having a frame structure for supporting a person and having a pair of vertical rear members, a plurality of wheels at least two of which are disposed on opposite sides of the frame structure to constitute driving wheels, a pair of tilting levers extending rearwardly from the frame structure and between the wheels, and control means including a control unit which is connected to the electrical driving apparatus to control both the driving and steering of the wheel chair by the relative rotation of the driving wheels, comprising:

a parallel pair of frame members, each having a vertical portion and a rearwardly extending horizontal portion, said vertical portion being adapted to forwardly abut against a corresponding one of said pair of frame structure vertical rear members;

a battery platform means disposed between and secured to said horizontal portions of said frame members for supporting a battery means thereon;

a pair of horizontally parallel support tubes each secured to a respective one of said horizontal portions of said frame members adapted for receiving a corresponding one of said tilting levers in telescoped engagement therewith for supporting the electrical driving apparatus on the wheel chair;

motor mount means having a pair of opposite ends each resiliently mounted on a respective one said vertical portion;

a pair of reversible electric motors mounted on said motor mount means and each having drive shaft means adapted for driving engagement with one of the driving wheels; and a pair of connecting arm means each pivotally secured to a corresponding one of said vertical portions and adapted for releasably retained engagement with the frame structure of the wheel chair.

20. Apparatus in accordance with claim 19 wherein each of said support tubes constitutes a hollow tube having a forward end open for permitting entry therein of the corresponding one of said tilting levers and having a smooth continuous interior surface only slightly greater in dimensions than the dimensions of such tilting lever.

21. Apparatus in accordance with claim 19 wherein each of said vertical portions has a tubular open top end provided with a downwardly extending rearwardly facing vertical slots; and each of said ends of said motor mount means being provided with vertical rod means and a spacer member connecting said rod means to said end, said rod means being disposed and captured within said vertical portion of said frame member in vertically slidable resiliently mounted relationship thereto, said spacer member being disposed within said slot in vertically slidable relationship thereto.

22. In combination with an electrically driven wheel chair having a pair of independently rotatable drive wheels, main battery means providing a source of DC power, a pair of reversible DC motors each having drive means engageable with a respective one of the drive wheels and a forward and reverse field winding coupled to said source of DC power, and a universal movement joystick mechanism, an electronic motor controller comprising in combination:

transistorized current amplifier means coupled to said source of DC power in current switching relationship to each of said field windings;

DC bias means;

potentiometer means manually operable by said joystick mechanism and coupling said DC bias means to said amplifier means for variably controlling such current switching whereby said drive wheels may be individually selectively driven in either direction at any relative speed.

23. The combination defined in claim 22 wherein said DC bias means includes generator means for generating a continuous train of pulses each having a predetermined duration and magnitude; and said potentiometer means variably controls the effective relationship of said pulses to said amplifier means.

24. The combination defined in claim 23 wherein said pulse train has a sawtooth waveform whereby such effective relationship is determined by the portion of such pulse duration coupled to said amplifier means by said potentiometer means.

References Cited

UNITED STATES PATENTS

| | | | |
|---|---|---|---|
| 2,544,831 | 3/1951 | Guyton | 180—74 X |
| 2,798,565 | 7/1957 | Rosenthal et al. | 180—74 X |
| 2,993,550 | 7/1961 | Klappert | 180—65 X |
| 3,100,547 | 8/1963 | Rosenthal | 180—6.5 |

KENNETH H. BETTS, *Primary Examiner.*